(12) United States Patent
Abe

(10) Patent No.: US 12,052,388 B2
(45) Date of Patent: Jul. 30, 2024

(54) RELAY APPARATUS, COMMUNICATION SYSTEM, RELAY METHOD, AND PROGRAM

(71) Applicant: NEC Platforms, Ltd., Kawasaki (JP)

(72) Inventor: Takumi Abe, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/924,452

(22) PCT Filed: Apr. 16, 2021

(86) PCT No.: PCT/JP2021/015763
§ 371 (c)(1),
(2) Date: Nov. 10, 2022

(87) PCT Pub. No.: WO2021/235149
PCT Pub. Date: Nov. 25, 2021

(65) Prior Publication Data
US 2023/0300245 A1    Sep. 21, 2023

(30) Foreign Application Priority Data

May 20, 2020    (JP) ................................. 2020-087881

(51) Int. Cl.
*H04M 3/42*    (2006.01)
(52) U.S. Cl.
CPC ............... *H04M 3/42102* (2013.01)
(58) Field of Classification Search
CPC ............ H04M 3/42102; H04M 3/02; H04M 3/42212; H04M 3/42314; H04Q 2213/1322; H04Q 3/62
See application file for complete search history.

(56) References Cited

U.S. PATENT DOCUMENTS 10,554,717 B2 *  2/2020  Torgersrud ........... H04L 65/1043
2010/0272250 A1 * 10/2010  Yap .......................... H04M 3/58
379/212.01

(Continued)

FOREIGN PATENT DOCUMENTS

JP    2006-019984 A    1/2006
JP    2013-207320 A    10/2013

(Continued)

OTHER PUBLICATIONS

International Search Report for PCT Application No. PCT/JP2021/015763, mailed on Jul. 13, 2021.

(Continued)

*Primary Examiner* — Akelaw Teshale

(57) ABSTRACT

A relay apparatus capable of reducing a load on a private branch exchange when an incoming call is made to an extension representative number is provided. A relay apparatus (1) includes a reception unit (2), a generation unit (4), and a transmission unit (6). The reception unit (2) receives, from the private branch exchange, incoming call notification information indicating an incoming call notification, which is a notification indicating that the incoming call is made to the extension representative number. The generation unit (4) generates a push notification request corresponding to the incoming call notification for each of a plurality of mobile terminals belonging to the group of the extension representative number based on the incoming call notification information. The transmission unit (6) performs processing for transmitting the push notification request to the corresponding mobile terminal.

14 Claims, 8 Drawing Sheets

(56) References Cited

U.S. PATENT DOCUMENTS

2016/0330252 A1* 11/2016 Stahl .................. H04M 7/0066
2017/0331946 A1* 11/2017 Mumick ............... H04M 15/08
2018/0227431 A1*  8/2018 Miyata .................... H04Q 3/58
2019/0349829 A1* 11/2019 Balasaygun ........ H04L 65/1069
2020/0022002 A1*  1/2020 Karanam ............ H04M 3/2236

FOREIGN PATENT DOCUMENTS

| JP | 2017-063421 A | 3/2017 |
| JP | 2018-198369 A | 12/2018 |
| JP | 2018-198418 A | 12/2018 |
| JP | 2019-186701 A | 10/2019 |
| JP | 2019-212942 A | 12/2019 |
| JP | 2019212942 A * | 12/2019 |
| JP | 2020-047974 A | 3/2020 |

OTHER PUBLICATIONS

Japanese Office Communication for JP Application No. 2020-087881 mailed on Oct. 5, 2021 with English Translation.
Extended European Search Report for EP Application No. 21808411.9, dated on Sep. 7, 2023.

* cited by examiner

| EXTENSION REPRESENTATIVE NUMBER GROUP | MOBILE TERMINAL NUMBER | | |
|---|---|---|---|
| | | EXTENSION PHONE NUMBER | MOBILE PHONE NUMBER |
| 1100 | #1-1 | 1101 | 090-1234-1101 |
| | #1-2 | 1102 | 090-1234-1102 |
| | #1-3 | 1103 | 090-1234-1103 |
| | #1-4 | 1104 | 090-1234-1104 |
| | ... | ... | ... |
| 1200 | #2-1 | 1201 | 090-1234-1201 |
| | #2-2 | 1202 | 090-1234-1202 |
| | #2-3 | 1203 | 090-1234-1203 |
| | #2-4 | 1204 | 090-1234-1204 |
| | ... | ... | ... |
| 1300 | ... | ... | ... |

Fig. 5

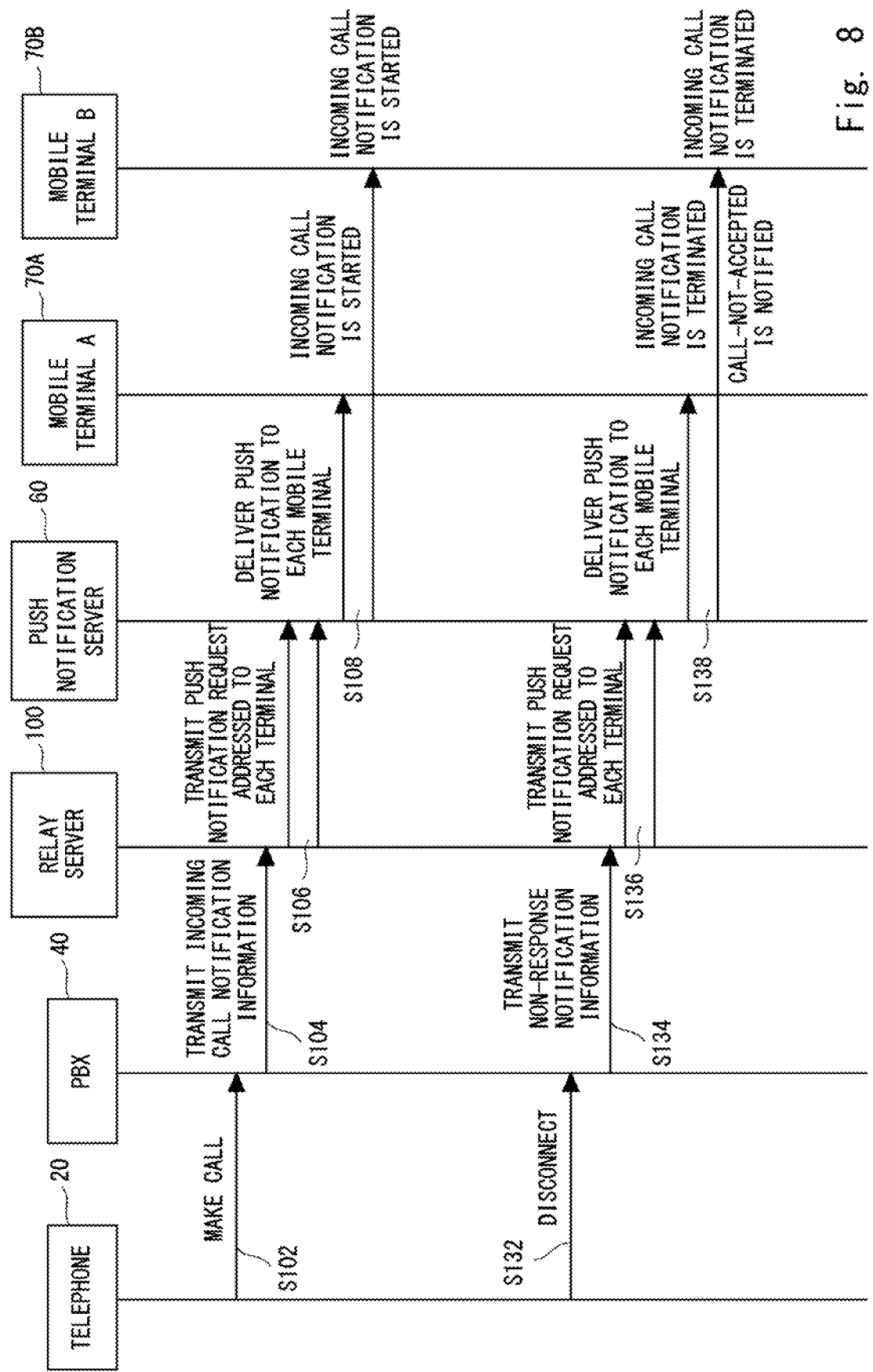

RELAY APPARATUS, COMMUNICATION SYSTEM, RELAY METHOD, AND PROGRAM

This application is a National Stage Entry of PCT/JP2021/015763 filed on Apr. 16, 2021, which claims priority from Japanese Patent Application 2020-087881 filed on May 20, 2020, the contents of all of which are incorporated herein by reference, in their entirety.

TECHNICAL FIELD

The present invention relates to a relay apparatus, a communication system, a relay method, and a program.

BACKGROUND ART

The technology of private branch exchange (PBX) which connects many private branch telephones to public switched telephone network have been known. With regard to one such technique, Patent Literature 1 discloses a system which includes a private branch exchange and a caller information notification management device, and enables a smartphone which receives telephone transfer via the private branch exchange to surely confirm the caller information. In Patent Literature 1, the private branch exchange transfers an incoming call to an extension terminal transmitted from a source telephone to a smartphone, and transmits an incoming call notification including the telephone number of the source telephone and the telephone number of the extension terminal to a caller information notification management device. Upon receiving the incoming call notification from the private branch exchange, the caller information notification management device transmits a request for push notification of the caller information including the telephone number of the caller telephone with the smartphone as the delivery destination to the push notification server.

Patent Literature 2 discloses a telephone exchange apparatus that connects a plurality of telephone terminals to each other via a communication network for transmitting voice packets and allows the plurality of telephone terminals to communicate with each other. When a connection request addressed to an extension group is generated, the telephone exchange apparatus according to Patent Literature 2 performs connection control for the telephone terminal of the corresponding extension group by referring to the group table. When connecting to the extension group, the telephone exchange apparatus transfers the voice packet sent from the request source to all telephone terminals belonging to the extension group through the communication network.

CITATION LIST

Patent Literature

[Patent Literature 1] Japanese Unexamined Patent Application Publication No. 2019-212942
[Patent Literature 2] Japanese Unexamined Patent Application Publication No. 2006-019984

SUMMARY OF INVENTION

Technical Problem

According to the techniques disclosed in the aforementioned Patent Literature, when an incoming call is made to an extension representative number, a private branch telephone exchange (telephone exchange apparatus) transmits (transfers) an incoming call notification to a terminal belonging to a group of the extension representative number. In particular, the telephone exchange apparatus according to Patent Literature 2 generates a group paging request signal including group setting information for all telephone terminals belonging to the extension group. As described above, in the technique disclosed in the aforementioned Patent Literature, when an incoming call is made to the extension representative number, the private branch exchange transmits the notification information as many as the number of all terminals belonging to the group of the extension representative number for each incoming call to the extension representative number. Therefore, the load on the private branch exchange may increase.

The present disclosure has been made in order to solve the aforementioned problem and an object of the present disclosure is to provide a relay apparatus, a communication system, a relay method, and a program capable of reducing a load on a private branch exchange when an incoming call is made to an extension representative number.

Solution to Problem

A relay apparatus according to the present disclosure includes: reception means for receiving, from a private branch exchange, incoming call notification information indicating an incoming call notification, which is a notification indicating that an incoming call is made to an extension representative number; generation means for generating a push notification request corresponding to the incoming call notification for each of a plurality of mobile terminals belonging to a group of the extension representative number based on the incoming call notification information; and transmission means for performing processing for transmitting the push notification request to the corresponding mobile terminal.

Further, a communication system according to the present disclosure includes: a relay apparatus and the private branch exchange.

Further, a relay method according to the present disclosure includes: receiving, from a private branch exchange, incoming call notification information indicating an incoming call notification, which is a notification indicating that an incoming call is made to an extension representative number; generating a push notification request corresponding to the incoming call notification for each of a plurality of mobile terminals belonging to a group of the extension representative number based on the incoming call notification information; and performing processing for transmitting the push notification request to the corresponding mobile terminal.

Further, a program according to the present disclosure causes a computer to execute the following steps of: receiving, from a private branch exchange, incoming call notification information indicating an incoming call notification, which is a notification indicating that an incoming call is made to an extension representative number; generating a push notification request corresponding to the incoming call notification for each of a plurality of mobile terminals belonging to a group of the extension representative number based on the incoming call notification information; and performing processing for transmitting the push notification request to the corresponding mobile terminal.

Advantageous Effects of Invention

According to the present disclosure, it is possible to provide a relay device, a communication system, a relay method, and a program capable of reducing a load on a private branch exchange when an incoming call is made to an extension representative number.

BRIEF DESCRIPTION OF DRAWINGS

FIG. 5 is a diagram illustrating a database of extension representative number groups according to the first example embodiment;

FIG. 8 is a sequence diagram showing a communication method (relay method) executed by the communication system according to the first example embodiment.

EXAMPLE EMBODIMENT

Outline of Example Embodiments According to the Present Disclosure

Figure 1:
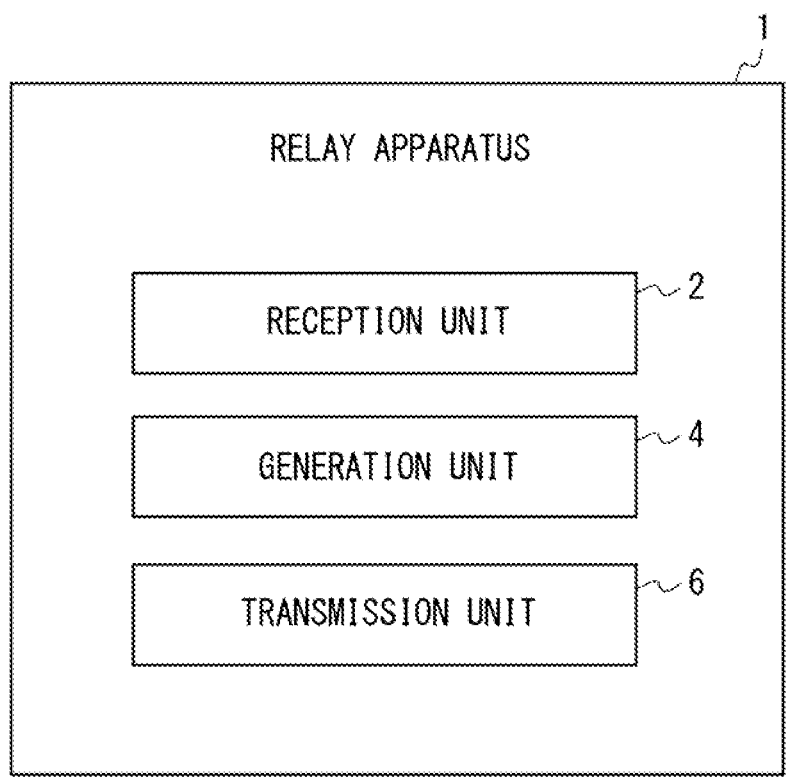
FIG. 1 is a diagram showing an outline of a relay apparatus according to an example embodiment of the present disclosure.

Prior to giving the description of example embodiments of the present disclosure, an outline of the example embodiments according to the present disclosure will be described. FIG. 1 is a diagram showing an outline of a relay apparatus 1 according to an example embodiment of the present disclosure. The relay apparatus 1 is, for example, a computer such as a server. Therefore, the relay apparatus 1 functions as a relay server.

The relay apparatus 1 is communicably connected to a private branch exchange (PBX). The relay apparatus 1 includes a reception unit 2, a generation unit 4, and a transmission unit 6. The reception unit 2 includes a function as reception means. The generation unit 4 includes a function as generation means. The transmission unit 6 includes a function as transmission means. The processing of the reception unit 2, the generation unit 4, and the transmission unit 6 will be described below.

Figure 2:
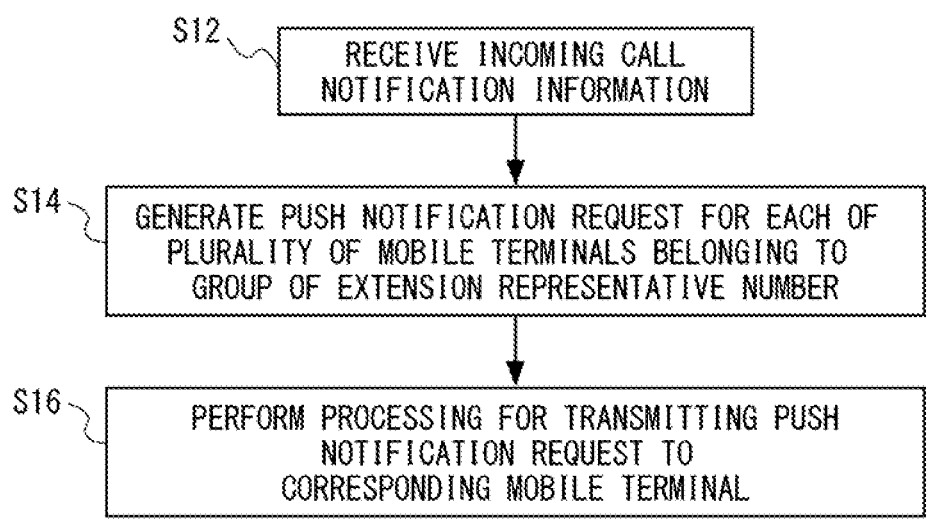
FIG. 2 is a flowchart showing a relay method executed by the relay apparatus shown in FIG. 1.

FIG. 2 is a flowchart showing a relay method executed by the relay apparatus 1 shown in FIG. 1. The reception unit 2 receives, from the private branch exchange, incoming call notification information indicating an incoming call notification, which is a notification indicating that the incoming call is made to the extension representative number (Step S12). The generation unit 4 generates a push notification request corresponding to the incoming call notification for each of a plurality of mobile terminals belonging to the group of the extension representative number based on the incoming call notification information (Step S14). The transmission unit 6 performs processing for transmitting the push notification request to the corresponding mobile terminal (Step S16). For example, the transmission unit 6 may transmit the push notification request to the push notification server. Accordingly, the push notification request is transmitted to the mobile terminal. The push notification server is communicatively connected to the relay apparatus 1. The push notification server is a server which transmits a push notification to a mobile terminal.

Figure 3:
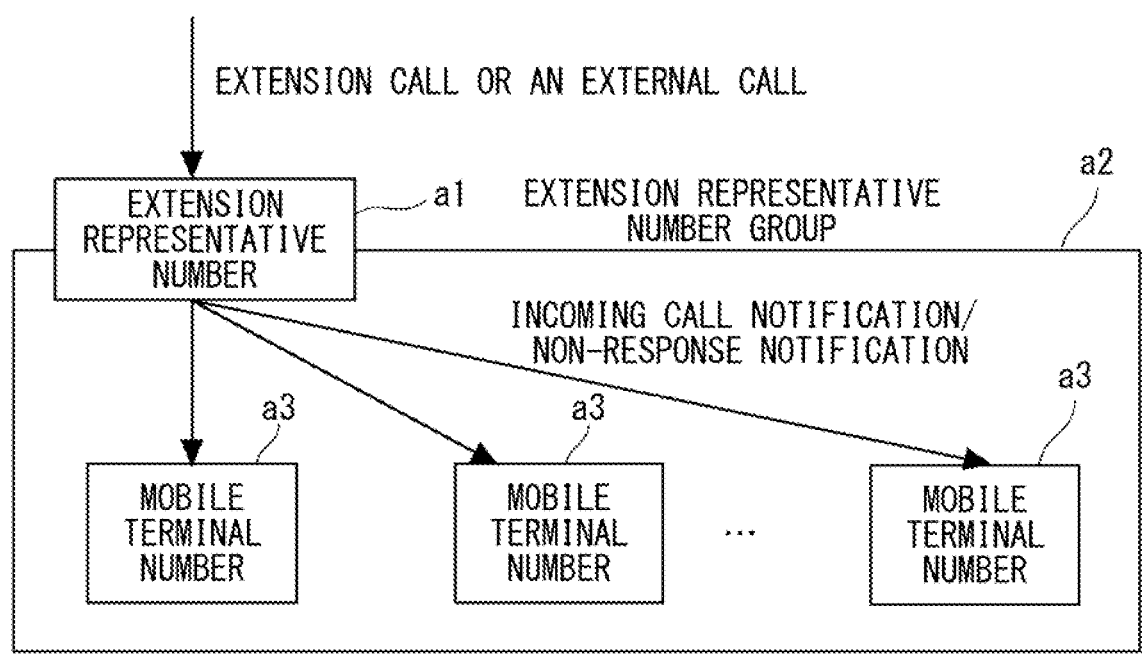
FIG. 3 is a diagram conceptually showing a flow of an incoming call notification when an incoming call is made to an extension representative number.

FIG. 3 is a diagram conceptually showing a flow of an incoming call notification when an incoming call is made to an extension representative number. Assume that an incoming call is made to an extension representative number a1 by an extension call or an external call. In this case, the relay apparatus 1 generates a push notification request corresponding to the incoming call notification for the mobile terminal number a3 of a plurality of mobile terminals belonging to an extension representative number group a2 which is a group of the extension representative number a1. Then, the relay apparatus 1 transmits the push notification request to each of the mobile terminals through, for example, the push notification server.

In this way, the relay apparatus 1 distributes the incoming call to a plurality of the mobile terminals belonging to the extension representative number group a2. Thus, the incoming call notification is displayed on each of the mobile terminals. Note that, even when a non-response notification is made to the private branch exchange after the incoming call is made, the relay apparatus 1 generates a push notification request corresponding to the non-response notification for the mobile terminal number a3 of a plurality of the mobile terminals belonging to the extension representative number group a2.

As described above, the relay apparatus 1 according to the present example embodiment is configured to generate, when an incoming call to the extension representative number is made for the private branch exchange, the push notification request corresponding to the incoming call notification for each of a plurality of mobile terminals belonging to the group of the extension representative number. Accordingly, it is not necessary for the private branch exchange to generate incoming call notification information for a plurality of mobile terminals belonging to the group of the extension representative number and transmit the information to each mobile terminal. Therefore, the load on the private branch exchange (network load, etc.) can be reduced. Thus, the private branch exchange can smoothly perform other exchange processing (the process of exchanging information over a network, such as receiving, responding, and transferring telephone calls). The relay method shown in FIG. 2 and the program for implementing the relay method can also reduce the load on the private branch exchange. The communication system including the relay apparatus 1 and the private branch exchange can also reduce the load on the private branch exchange.

First Example Embodiment

Hereinafter, with reference to the drawings, example embodiments will be described. In order to clarify the explanation, the following descriptions and the drawings are omitted and simplified as appropriate. Further, throughout the drawings, the same components are denoted by the same reference symbols and overlapping descriptions are omitted as necessary.

Figure 4:
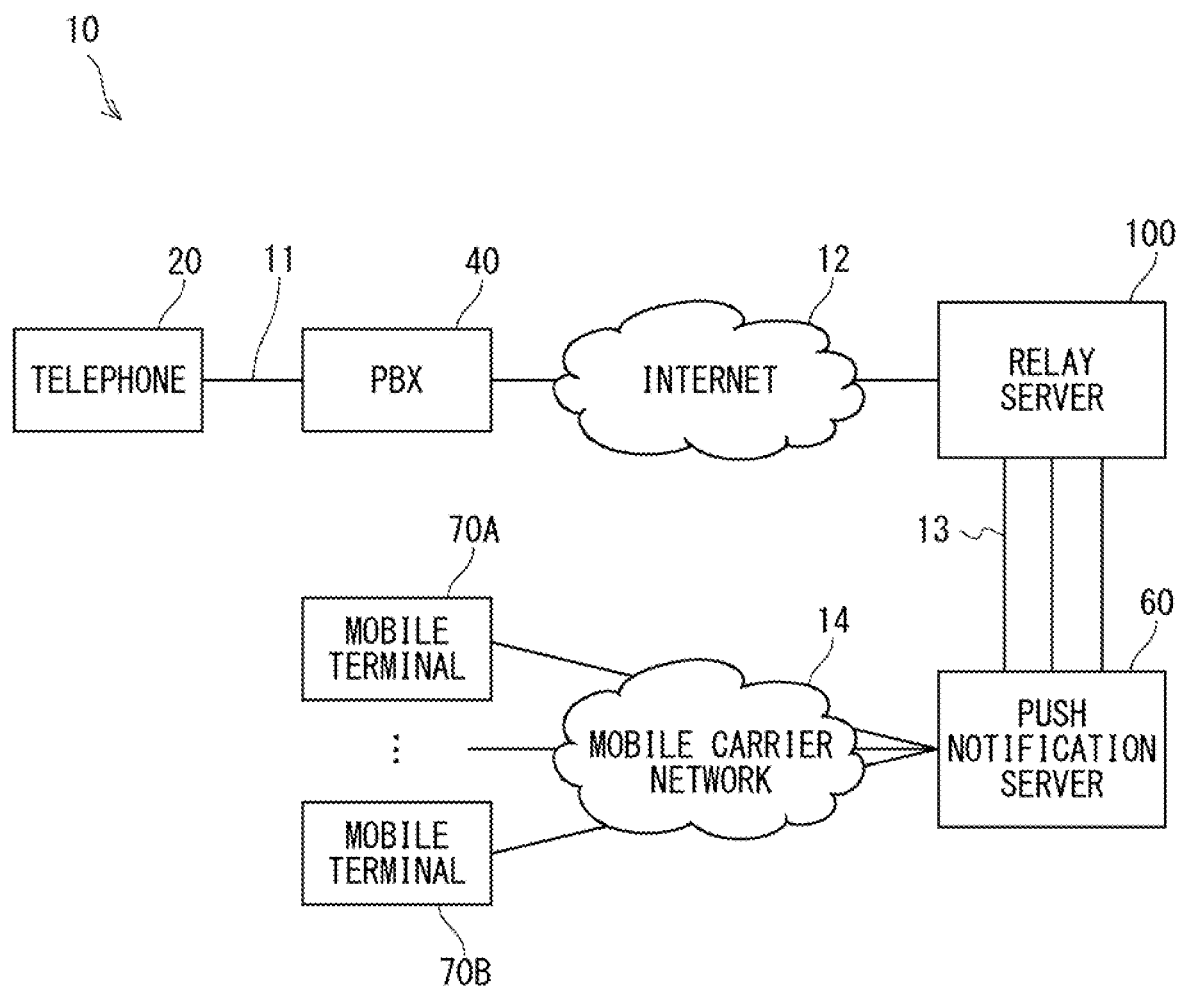
FIG. 4 is a diagram showing a configuration of a communication system according to a first example embodiment.

FIG. 4 is a diagram showing a configuration of a communication system 10 according to the first example embodiment. The communication system 10 includes a telephone 20, a private branch exchange 40 (PBX), a relay server 100, a push notification server 60, and a plurality of mobile terminals 70 (70A, 70B, - - - ). The private branch exchange 40 is connected to the telephone 20 via an extension or external telephone network 11. The private branch exchange 40 is connected to the relay server 100 via the Internet 12. The private branch exchange 40 may be connected to the mobile terminal 70 via the Internet. One relay server 100 may be connected to a plurality of private branch exchanges 40. In this case, a plurality of private branch exchanges 40 may share one relay server 100.

The relay server 100 is connected to the push notification server 60 via the Internet 13. The push notification server 60 is connected to the mobile terminals 70 via the mobile carrier network 14. Although the Internet 12 and the Internet 13 are shown separately in the figure, they may be the same Internet (for example, the Internet 12).

The private branch exchange 40 may be, for example, a computer. The private branch exchange 40 relays communication between the telephone 20 and the mobile terminals 70 through the telephone network 11 and the Internet 12. When receiving an incoming call to the extension representative number from the telephone 20, the private branch exchange 40 retrieves the mobile terminal number of the mobile terminal 70 belonging to the extension representative number group related to the extension representative number by using the database of the extension representative number group. The private branch exchange 40 transmits the retrieved mobile terminal number to the relay server 100. When the private branch exchange 40 receives an incoming call to the extension representative number from the telephone 20, it transmits the incoming call notification information including information on the extension representative number group to the relay server 100. Here, the extension representative number is, for example, an extension number addressed to any (all) terminals of an organization in an enterprise or the like.

The relay server 100 corresponds to the relay apparatus 1 shown in FIG. 1. The relay server 100 is, for example, a computer. The relay server 100 communicates with the push notification server 60 instead of the private branch exchange 40. In other words, the relay server 100 relays the communication between the private branch exchange 40 and the push notification server 60. Therefore, the relay server 100 functions as a proxy server (push proxy server). The configuration of the relay server 100 will be described later.

The relay server 100 generates a push notification request for each mobile terminal number from the information of the extension representative number group received from the private branch exchange 40 and transmits it to the push notification server. Specifically, the relay server 100 converts the incoming call notification information regarding the extension representative number group transmitted from the private branch exchange 40 into incoming call notification information addressed to the respective mobile terminals 70. Then, the relay server 100 transmits, to the push notification server 60, the converted incoming call notification information as the push notification request. Here, the relay server 100 converts the incoming call notification transmitted from the private branch exchange 40 into the push notification request so as to meet the specifications of the push notification server 60.

The push notification server 60 is, for example, a computer. The push notification server 60 transmits the push notification to the corresponding mobile terminal 70 based on the push notification request received from the relay server 100.

The mobile terminal 70 is, for example, a computer. The mobile terminal 70 is connected to the private branch exchange 40 via the extension telephone network or the Internet 12. The mobile terminal 70 can make an extension call (i.e., extension-to-extension call) and an external call via the private branch exchange 40. The mobile terminal 70 receives the push notification from the push notification server 60 via the mobile carrier network 14. Based on the contents of the push notification, the mobile terminal 70 makes the incoming call notification by screen display, sound or vibration. Accordingly, the user of the mobile terminal 70 can perform an operation to respond to an incoming call to the extension representative number.

FIG. 5 is a diagram illustrating a database of extension representative number groups according to the first example embodiment. In the example of FIG. 5, for example, the mobile terminal number of the mobile terminal 70 belonging to the extension representative number group "1100" includes the mobile terminal number #1-1, the mobile terminal number #1-2, the mobile terminal number #1-3, and the mobile terminal number #1-4. The mobile terminal number #1-1 is "Extension phone number 1101, External phone number 090-1234-1101". The mobile terminal number #1-2 is "Extension phone number 1102, External phone number 090-1234-1102". The mobile terminal number #1-3 is "Extension phone number 1103, External phone number 090-1234-1103". The mobile terminal number #1-4 is "Extension phone number 1104, External phone number 090-1234-1104". The same is applicable to extension number group "1200" and the like.

When, for example, the private branch exchange 40 receives an incoming call to the extension representative number "1100" from the telephone 20, the private branch exchange 40 retrieves the mobile terminal number #1-1, the mobile terminal number #1-2, the mobile terminal number #1-3 and the mobile terminal number #1-4 by using the database illustrated in FIG. 5. The private branch exchange 40 transmits the mobile terminal number #1-1, the mobile terminal number #1-2, the mobile terminal number #1-3, and the mobile terminal number #1-4 to the relay server 100. The private branch exchange 40 transmits information related to the extension representative number group "1100" to the relay server 100.

As described above, in the communication system 10 according to the first example embodiment, the private branch exchange 40 retrieves the mobile terminal numbers in the extension representative number group. The private branch exchange 40 transmits the incoming call notification information including the retrieved mobile terminal numbers and the information of the extension representative number group to the relay server 100. The relay server 100 combines the transmitted mobile terminal number and the information of the extension representative number group to generate a push notification request for each of the mobile terminals 70 in a form conforming to the specifications of the push notification server 60.

Figure 6:
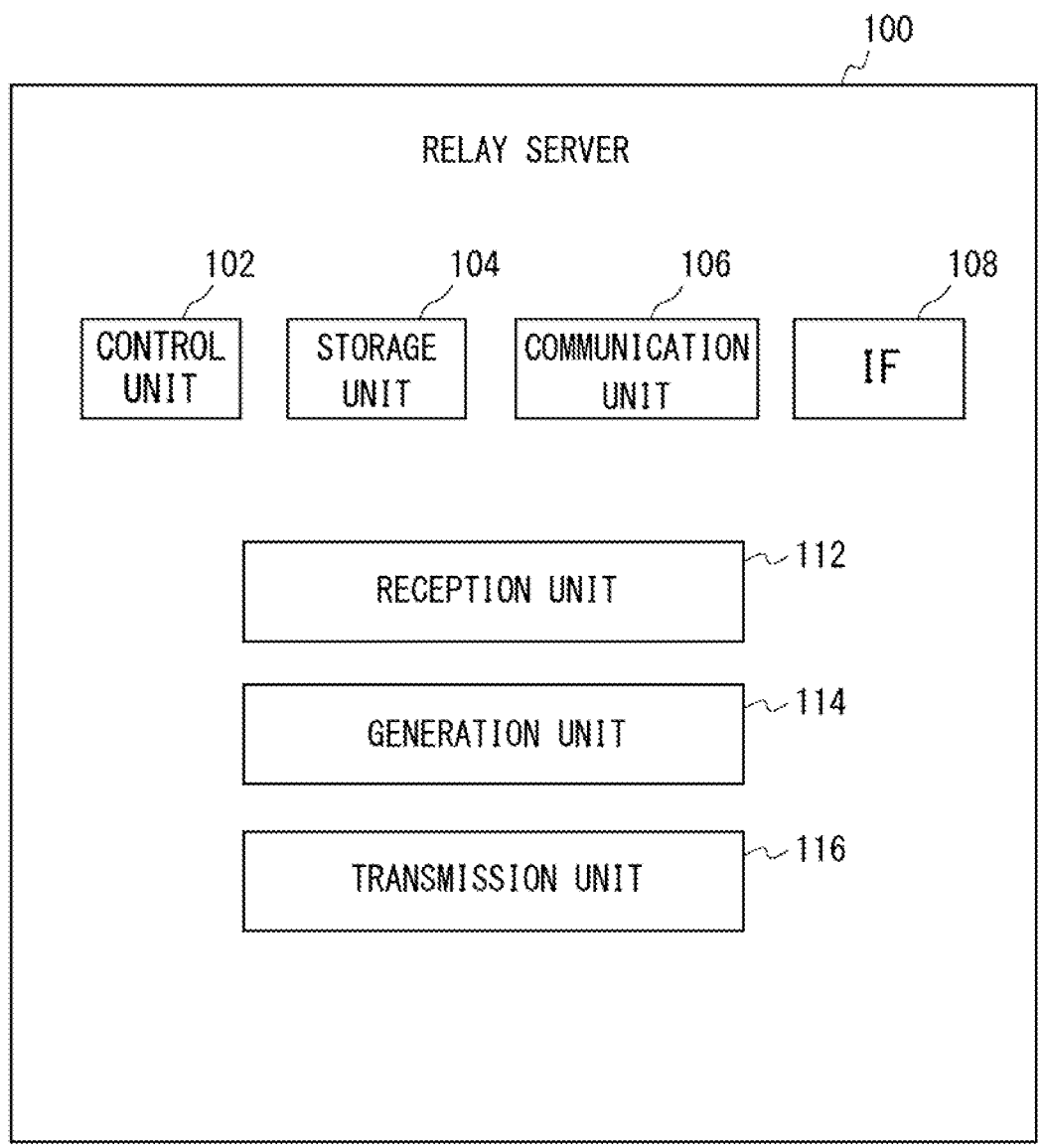
FIG. 6 is a diagram showing a configuration of a relay server according to the first example embodiment.

FIG. 6 is a diagram showing a configuration of the relay server 100 according to the first example embodiment. The relay server 100 includes, as main hardware configurations, a control unit 102, a storage unit 104, a communication unit 106, and an interface unit (IF) 108. The control unit 102, the storage unit 104, the communication unit 106, and the interface unit 108 are connected to one another via a data bus or the like. Note that the telephone 20, the private branch exchange 40, the push notification server 60, and the mobile terminal 70 shown in FIG. 4 may also include the hardware configurations shown in FIG. 6.

The control unit 102 is, for example, a processor such as a Central Processing Unit (CPU). The control unit 102 has a function as an arithmetic apparatus that performs, for example, control processing and arithmetic processing. The storage unit 104 is, for example, a storage device such as a memory or a hard disc. The storage unit 104 is, for example, a Read Only Memory (ROM) or a Random Access Memory (RAM). The storage unit 104 has a function for storing, for example, a control program(s) and an arithmetic program(s) executed by the control unit 102. Further, the storage unit 104 has a function for temporarily storing processing data and the like. Storage 104 may include a database.

The communication unit 106 performs processing necessary for communicating with the private branch exchange 40 and the push notification server 60. The communication unit 106 may include, for example, a communication port, a router, and a firewall. The interface unit (IF) 108 is, for example, a user interface (UI). The interface unit 108 includes an input device such as a keyboard, a touch panel, or a mouse, and an output device such as a display or a speaker. The interface unit 108 receives an operation of inputting data performed by a system administrator and outputs information to the system administrator.

The relay server 100 according to the first example embodiment includes, as components, a reception unit 112, a generation unit 114, and a transmission unit 116. The reception unit 112 corresponds to the reception unit 2 shown in FIG. 1. The reception unit 112 includes a function as reception means. The generation unit 114 corresponds to the generation unit 4 shown in FIG. 1. The generation unit 114 includes a function as generation means. The transmission unit 116 corresponds to the transmission unit 6 shown in FIG. 1. The transmission unit 116 includes a function as transmission means. The processing of the reception unit 112, the generation unit 114, and the transmission unit 116 will be described with reference to a sequence diagram to be described later.

Note that each of the aforementioned components may be implemented, for example, by executing a program under the control of the control unit 102. More specifically, each of the components may be implemented by the control unit 102 executing a program stored in the storage unit 104. Further, each of the components may be implemented by installing a necessary program stored in any nonvolatile recording medium as required. Further, each of the components is not necessarily implemented by software executed by a program, and may instead be implemented, for example, by any combination of hardware, firmware, and software. Further, each of the components may also be implemented using a user-programmable integrated circuit, such as a field-programmable gate array (FPGA) or a microcomputer. In this case, a program composed of each of the aforementioned components may be implemented by using this integrated circuit.

Figure 7:
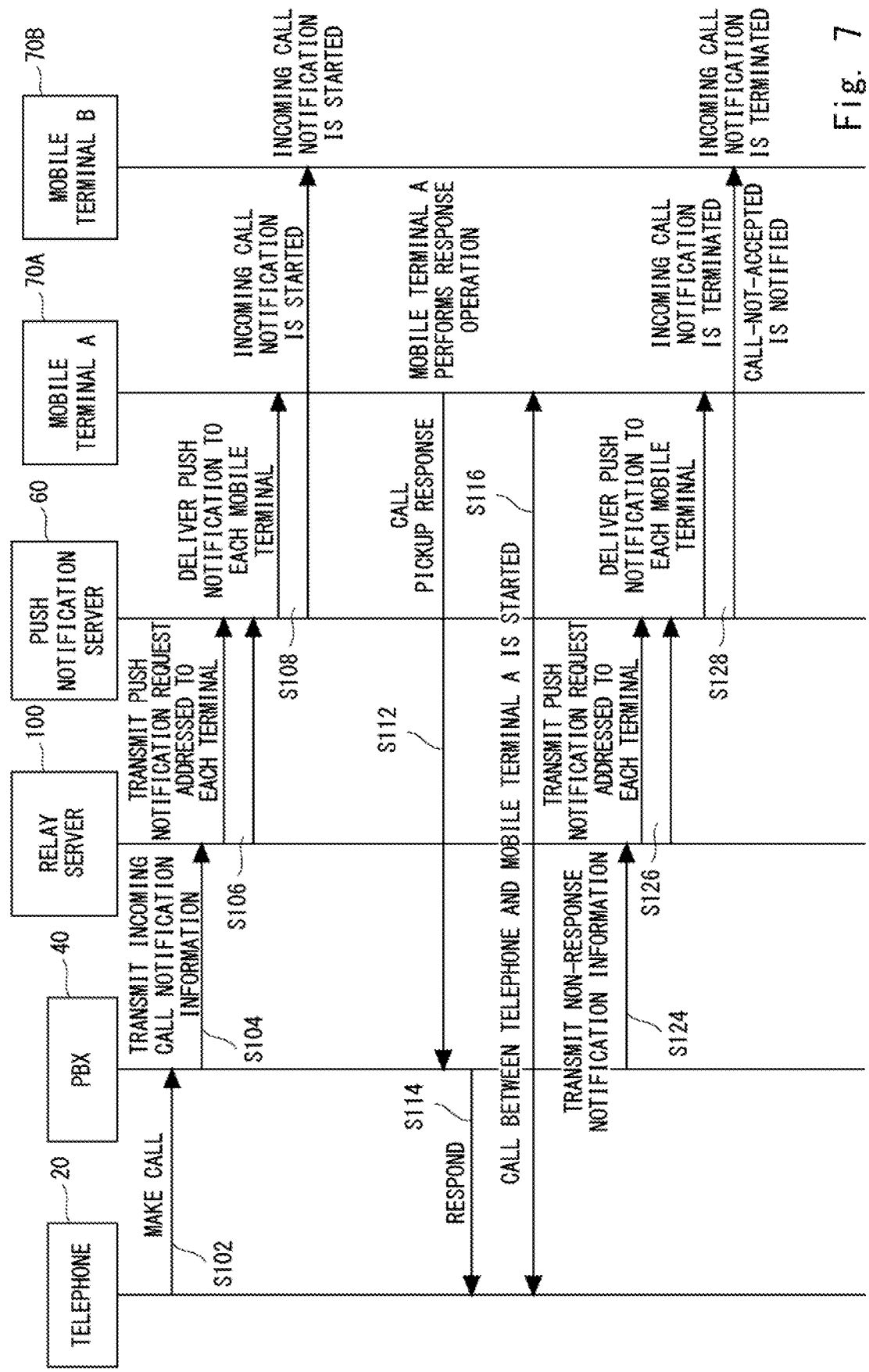
FIG. 7 is a sequence diagram showing a communication method (relay method) executed by the communication system according to the first example embodiment.

FIGS. 7 and 8 are sequence diagrams showing a communication method (relay method) executed by the communication system 10 according to the first example embodiment. FIG. 7 shows a processing flow when any of the mobile terminals 70 responds to the incoming call notification. The telephone 20 makes a call to the extension representative number (Step S102). Accordingly, the private branch exchange 40 receives an incoming call to the extension representative number from the telephone 20. The private branch exchange 40 transmits the incoming call notification information to the relay server 100 (Step S104).

The relay server 100 transmits a push notification request addressed to each mobile terminal 70 (Step S106). Specifically, the reception unit 112 receives the incoming call notification information including the mobile terminal numbers and information on the extension representative number group from the private branch exchange 40 via the Internet 12 and the communication unit 106. The reception unit 112 outputs the received incoming call notification information to the generation unit 114. The generation unit 114 analyzes the incoming call notification information and generates a push notification request corresponding to the incoming call notification information for each of a plurality of mobile terminals 70 belonging to the extension representative number group. The transmission unit 116 transmits the push notification request to the push notification server 60 via the communication unit 106 and the network.

A specific process of the generation unit 114 will be described. The generation unit 114 converts the incoming call notification information into the push notification request addressed to each mobile terminal 70. More specifically, the generation unit 114 generates, from the mobile terminal numbers in the extension representative number group and the extension representative number, push notification requests addressed to the corresponding mobile terminals 70 for the number of the mobile terminals 70. At this time, the generation unit 114 may generate the push notification request so that the mobile terminal number in the extension representative number group is set as a destination (transmission destination).

For example, the generation unit 114 generates the push notification request including a call pickup special number, an extension representative number, and a caller number (i.e., caller ID). Here, the call pickup special number is a number for responding to an incoming call to the extension representative number. The caller number is the number (i.e., phone number) of the telephone 20 which has made a call to the extension representative number. Thus, as will be described later, a call between the mobile terminal 70 and the telephone 20 can be established.

For example, in the example of FIG. 5, it is assumed that there is a simultaneous call transmission (paging) to the extension representative number "1100" from the telephone 20 (S102). In this case, the private branch exchange 40 transmits a notification (incoming call notification information) of the simultaneous call transmission to the extension representative number "1100" to the relay server 100 (S104). In this case, the generation unit 114 of the relay server 100 converts the incoming call notification information indicating the extension representative number "1100" into incoming call notification information (push notification request) indicating a mobile phone number belonging to the extension representative number group. That is, the generation unit 114 converts the incoming call notification information indicating the extension representative number "1100" into incoming call notification information indicating the mobile phone number "090-1234-1101" belonging to the extension representative number group. Similarly, the generation unit 114 of the relay server 100 converts the incoming call notification information indicating the extension representative number "1100" into incoming call notification information indicating the mobile phone number "090-1234-1102" belonging to the extension representative number group. The same applies to mobile phone numbers "090-1234-1103", "090-1234-1104" and the like. Then, the transmission unit 116 transmits the converted incoming call notification information (push notification request) to the mobile terminal 70 corresponding to the mobile phone number indicated in the converted incoming call notification information, via the push notification server 60.

Upon receiving the push notification request from the relay server 100, the push notification server 60 transmits a push notification corresponding to the push notification request to each mobile terminal 70 (Step S108). Accordingly, the push notifications are delivered to the mobile terminals 70A and 70B belonging to the extension representative number group via the mobile carrier network 14. Thus, the mobile terminals 70A, 70B start the incoming call notification.

Then, the mobile terminal 70 can respond to the extension representative number for which the incoming call is being made by the telephone 20 in response to the received push notification. In the example of FIG. 7, the mobile terminal 70A (mobile terminal A) performs a response operation. As a result, the mobile terminal 70A makes a call pickup response to the private branch exchange 40 (Step S112).

Specifically, according to the push notification request generated by the generation unit 114, the push notification includes information (number) necessary for a response operation, such as the call pickup special number, the extension representative number, and the caller number. Therefore, when the mobile terminal 70A performs a response operation after receiving the push notification, the mobile terminal 70A performs a transmitting operation (call pickup response) of the response request to the private branch exchange 40 by using the above-described number.

Upon receiving the response request from the mobile terminal 70A, the private branch exchange 40 performs response to the originating call (S102), to the telephone 20 (Step S114). Specifically, the private branch exchange 40 analyzes the above-described number transmitted from the mobile terminal 70A, and transmits a response request to the call originated from the telephone 20, to the telephone 20. Thus, the private branch exchange 40 performs connection processing between the telephone 20 and the mobile terminal 70A. In this way, a call between the telephone 20 and the mobile terminal 70A is started (Step S116).

Further, when one of the mobile terminals 70 belonging to the extension representative number group responds during the incoming call notification, the non-response notification information is delivered to the mobile terminal 70 by the same route as in the incoming call notification (S104 to S108), and the incoming call notification is terminated (S124 to S128). Specifically, when one of the mobile terminals 70 belonging to the extension representative number group responds, the private branch exchange 40 transmits the non-response notification information (Step S124). The non-response notification information is information indicating a notification which indicates an instruction not to respond to the incoming call to the extension representative number for which the incoming call is currently being made. In this case, the non-response notification information indicates a notification that one of a plurality of the mobile terminals 70 has responded to the incoming call to the extension representative number. The non-response notification information may indicate the extension representative number to which a certain mobile terminal 70 has responded. For example, when the mobile terminal 70 responds to the extension representative number "1100", the non-response notification information indicates the extension representative number "1100".

The relay server 100 transmits a push notification request addressed to each mobile terminal 70 (Step S126). Specifically, the reception unit 112 receives non-response notification information including information related to the extension representative number group from the private branch exchange 40, via the Internet 12 and the communication unit 106. The reception unit 112 outputs the received non-response notification information to the generation unit 114. The generation unit 114 analyzes the non-response notification information and generates a push notification request corresponding to the non-response notification information for each of a plurality of mobile terminals 70 belonging to the extension representative number group. The transmission unit 116 transmits the push notification request to the push notification server 60, via the communication unit 106 and the network.

In this case, the generation unit 114 generates the push notification request corresponding to the non-response notification information for each of all the mobile terminals 70, belonging to the extension representative number group, including the mobile terminal 70 which is responding to the incoming call. Then, the transmission unit 116 transmits the push notification request corresponding to the non-response notification information, to all the mobile terminals 70. For example, when the mobile terminal 70A responds to the extension representative number "1100", the transmission unit 116 transmits the push notification request corresponding to the non-response notification information to all the mobile terminals 70, belonging to the extension representative number group, including the mobile terminal 70A.

Upon receiving the push notification request from the relay server 100, the push notification server 60 transmits a push notification corresponding to the push notification request to each mobile terminal 70 (Step S128). Accordingly, the push notification is delivered to the mobile terminals 70A and 70B belonging to the extension representative number group via the mobile carrier network 14. As a result, the incoming call notification is terminated in the mobile terminal 70B. In this case, the mobile terminal 70A communicating with the telephone 20 is configured to ignore the push notification (non-response notification). In this way, by collectively transmitting the non-response notification to all the mobile terminals 70 belonging to the extension representative number group, it becomes unnecessary for the private branch exchange 40 to search for which mobile terminal 70 has responded. Therefore, the load on the private branch exchange 40 can be reduced.

FIG. 8 shows a processing flow when the telephone 20 disconnects the call before the mobile terminal 70 responds to the incoming call notification. Note that the processing of S102 to S108 are substantially the same as the processing shown in FIG. 7, and therefore the description thereof will be omitted. When the telephone 20 disconnects the call (Step S132), the private branch exchange 40 receives the disconnection of the call for the extension representative number from the telephone 20. At this time, the private branch exchange 40 transmits the non-response notification information (Step S134). In this case, the non-response notification information is information indicating a notification which indicates an instruction not to respond to the incoming call to the extension representative number for which the incoming call is currently being made, since the call to the extension representative number has been disconnected. The non-response notification information may indicate the extension representative number corresponding to the disconnected call. For example, when the call to the extension representative number "1100" is disconnected, the non-response notification information indicates the extension representative number "1100".

The relay server 100 transmits a push notification request addressed to each mobile terminal 70 (Step S136). Specifically, the reception unit 112 receives non-response notification information including information related to the extension representative number group from the private branch exchange 40, via the Internet 12 and the communication unit 106. The reception unit 112 outputs the received non-response notification information to the generation unit 114.

The generation unit 114 analyzes the non-response notification information and generates a push notification request corresponding to the non-response notification information for each of a plurality of mobile terminals 70 belonging to the extension representative number group. The transmission unit 116 transmits the push notification request to the push notification server 60, via the communication unit 106 and the network.

Upon receiving the push notification request from the relay server 100, the push notification server 60 transmits a push notification corresponding to the push notification request to each mobile terminal 70 (Step S138). Accordingly, the push notification is delivered to the mobile terminals 70A and 70B belonging to the extension representative number group via the mobile carrier network 14. As a result, the incoming call notification is terminated in the mobile terminals 70A and 70B.

In the related art described above, when an incoming call to the extension representative number is received, the private branch exchange simultaneously transmits incoming call instructions to the fixed terminals and the mobile terminals which belong to the extension representative number group to which the incoming call is received. That is, the private branch exchange according to the related art uses the extension representative number group to make simultaneous notification of an incoming call to the extension representative number to the fixed terminals and the portable terminals registered in the extension representative number group. Thus, the fixed terminals and the portable terminals registered in the extension representative number group can respond to the incoming call to the extension representative number.

However, in recent mobile terminals, in order to save power, there is a case where the application of the mobile terminals can receive an incoming call instruction only when the sleep state is released. For example, there is a case where the operating system (OS) of a mobile terminal restricts background execution of an application. In this case, if the execution of the application used for the incoming call is restricted by the processing of the OS, the mobile terminal can receive the notification only at the timing when the sleep state of the OS is released. In other words, even if the private branch exchange simultaneously transmits the incoming call instruction to the mobile terminals belonging to the extension representative number group, the reception can be confirmed only in the mobile terminals in which the sleep state of the application is released at the timing when the incoming call instruction is transmitted. Therefore, the user of the mobile terminal cannot stably confirm the incoming call instruction to the extension representative number group.

In addition, the mobile terminal often performs the incoming call notification with the Session Initiation Protocol (SIP) method. In this method, it is necessary to always activate the call application in order to receive the SIP message, which may increase power consumption.

To solve this problem, push notifications could be used to make the incoming call notification even when the mobile terminal is in the sleep state. Specifically, by transmitting the push notification to the mobile terminal, the mobile terminal can activate any application in the sleep state. That is, by transmitting the push notification to the mobile terminal and activating the call application, the mobile terminal can receive the incoming call notification information, perform the incoming call notification, and be ready to respond. Further, since the application can be operated only when necessary, the notification can be stably delivered while the battery consumption of the mobile terminal is reduced.

If the private branch exchange transmits such a push notification to the mobile terminal, the load on the private branch exchange increases. That is, when an attempt is made to convert an incoming call notification into a push notification in accordance with the specifications of the push notification server, the network load on the private branch exchange increases. This may affect the primary function of the private branch exchange for exchanging information on the network, such as receiving, responding, and transferring telephone calls.

Also, as in the related art, when the private branch exchange transmits a notification to be transmitted to all the mobile terminals belonging to the extension representative number group, the private branch exchange needs to transmit the notification information as many as the number of all the terminals belonging to the extension representative number group, for each incoming call to the extension representative number. Therefore, the network load on the private branch exchange at the time of incoming call increases. For example, in the case of simultaneous call transmission (paging) to an extension representative number, it is necessary for the private branch exchange to convert the extension representative number to which the call is made into a mobile phone number belonging to the extension representative number group and transmit it to the public mobile network toward each mobile phone terminal. Therefore, a large load is placed on the private branch exchange because a call to one internal extension representative number becomes a plurality of external line calls.

On the other hand, the relay server 100 according to the first example embodiment is configured to convert the incoming call notification information into the push notification request addressed to each mobile terminal. In this way, by distributing the load of the incoming call notification to the relay server 100, the network load on the private branch exchange can be reduced. Thus, the influence on the primary function of the private branch exchange can be reduced.

Note that the private branch exchange 40 may include a function of confirming, when the mobile terminal 70 responds to the incoming call to the extension representative number, that the display of the caller number on the application of the mobile terminal 70 matches the caller number of a phone which actually makes a call to the responding extension representative number. In this method, the mobile terminal 70 which has received the incoming call notification displays the caller number and the extension representative number (or the extension representative number group name (for example, "General Affairs Department Representative").

In this case, it is assumed that callers X and Y, which are callers (telephones) different from each other, sequentially make and disconnect calls to the same extension representative number. At this time, due to congestion on the Internet or the like, the order in which the push notification is delivered to the mobile terminal 70 may be an incoming call notification of the caller X, an incoming call notification of the caller Y, a non-response notification of the caller X, and a non-response notification of the caller Y, in that order. In this case, when the mobile terminal 70 responds to the incoming call, a problem, that it is connected to the caller Y even though the display of the caller number is the number of the caller X, may occur.

In order to solve this problem, when responding to an incoming call to the extension representative number (S112 in FIG. 7), the mobile terminal 70 adds the caller number to the destination information of the INVITE request of the SIP sequence as follows:

(call pickup special number)+(extension representative number)+(separator)+(caller number)@(domain name).

For example, if the call pickup special number is "#123", the extension representative number to which the incoming call has been made is "1000", the caller number is "8000", the separator is "sep", and the domain name is "sample.com", the destination information of the INVITE request is "#123100sep.8000@sample.com".

Upon receiving the INVITE request, the private branch exchange 40 reads the number between the separator and the domain name as the caller number. The private branch exchange 40 compares the read caller number with the caller number calling the extension representative number. If they match, the private branch exchange 40 connects the call between the caller and the mobile terminal 70 so that it can respond to the incoming call. On the other hand, if they do not match, the private branch exchange 40 does not connect the call so that it cannot respond to the incoming call. By performing such processing, even when the push notification of the non-response notification information is not delivered to the mobile terminal 70 in a normal timing, it is possible to prevent or reduce the mismatch between the display of the caller number on the mobile terminal 70 and the caller number to which it actually responds.

Modified Examples

Note that the present invention is not limited to the aforementioned example embodiment and may be changed as appropriate within the scope of the present invention. In the above-described flowcharts and sequence diagrams, the order of each process (step) may be changed as appropriate. Further, one or more of a plurality of processes (steps) may be omitted.

In the aforementioned example embodiment, the case of not transmitting the incoming call notification to the mobile terminal 70 has been described, but this configuration is merely one example. For example, similarly to the processes of S104 to S108 shown in FIG. 7, the mobile terminal 70 may also be notified of call state information such as response, hold, and transfer. That is, the private branch exchange 40 transmits the call state information to the relay server 100 (S104). The relay server 100 transmits, to the push notification server 60, a push notification request addressed to the mobile terminals 70 belonging to the extension representative number group and corresponding to the call state information (S106). The push notification server 60 transmits a push notification to each of the mobile terminals 70 (S108). Accordingly, the call state is displayed on each of the mobile terminals 70.

In the processing of S104 to S108 shown in FIG. 7, when the incoming call notification information is transmitted, the information of the calling party (caller) may be transmitted together as additional information. The additional information includes the history or memo of the caller. Specifically, when transmitting the incoming call notification information, the private branch exchange 40 retrieves information on the caller and transmits the retrieved information, as additional information, together with the incoming call notification information (S104). The relay server 100 transmits, to the push notification server 60, a push notification request addressed to the mobile terminals 70 belonging to the extension representative number group and corresponding to the incoming call notification information and the additional information (S106). The push notification server 60 transmits a push notification to each of the mobile terminals 70 (S108). As a result, the additional information of the caller (calling party) at the time of incoming call is displayed on each of the mobile terminals 70.

Further, changing the notification content from the private branch exchange 40 from the incoming call notification to the private broadcast (i.e., public-address announcement) can cause the mobile terminals 70 belonging to the extension representative number group to output the private broadcast. Specifically, the private branch exchange 40 transmits, to the relay server 100, information for outputting the private broadcast (private broadcast information) (S104). The relay server 100 transmits a push notification request addressed to the mobile terminals 70 belonging to the extension representative number group and corresponding to the private broadcast information to the push notification server 60 (S106). The push notification server 60 transmits a push notification to each of the mobile terminals 70 (S108). As a result, each of the mobile terminals 70 outputs the private broadcast.

In the above-described example embodiment, the extension representative number is an extension number addressed to any terminal of an organization such as an enterprise, but this configuration is merely one example. The extension representative number may be an extension number addressed to a plurality of terminals of one individual. Therefore, the extension representative number group may be a group consisting of a plurality of terminals of one individual. In this case, for example, the extension representative number may be a fixed telephone number of one's own seat, and the mobile terminal belonging to the extension representative number group may be a mobile terminal number owned by the: individual. Accordingly, the mobile terminal can receive an incoming call even when the individual is away from his/her seat.

In the above-described examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, and semiconductor memories (such as mask ROM, Programmable ROM (PROM), Erasable PROM (EPROM), flash ROM, Random Access Memory (RAM), etc.). Further, the program(s) be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The whole or part of the example embodiment disclosed above can be described as, but not limited to, the following supplementary notes.
(Supplementary Note 1)
  A relay apparatus comprising:
    reception means for receiving, from a private branch exchange, incoming call notification information indicating an incoming call notification, which is a notification indicating that an incoming call is made to an extension representative number;

generation means for generating a push notification request corresponding to the incoming call notification for each of a plurality of mobile terminals belonging to a group of the extension representative number based on the incoming call notification information; and transmission means for performing processing for transmitting the push notification request to the corresponding mobile terminal.

(Supplementary Note 2)

The relay apparatus according to Supplementary Note 1, wherein the generation means converts the incoming call notification information into a push notification request addressed to each mobile terminal.

(Supplementary Note 3)

The relay apparatus according to Supplementary Note 2, wherein the generation means generates the push notification request from terminal numbers of a plurality of the mobile terminals belonging to the group of the extension representative number included in the incoming call notification information and the extension representative number.

(Supplementary Note 4)

The relay apparatus according to Supplementary Note 3, wherein the generation means generates the push notification request including a call pickup special number which is a number for responding to an incoming call to the extension representative number, the extension representative number, and a caller number which is a number of a telephone which has made a call to the extension representative number.

(Supplementary Note 5)

The relay apparatus according to any one of Supplementary Notes 1 to 4, wherein the transmission means transmits the push notification request to a push notification server that transmits a push notification to the mobile terminal.

(Supplementary Note 6)

The relay apparatus according to any one of Supplementary Notes 1 to 5, wherein, when the reception means receives, from the private branch exchange, non-response notification information indicating a notification that one of a plurality of the mobile terminals has responded to an incoming call to the extension representative number, the generation means generates a push notification request corresponding to the non-response notification information to each of all the mobile terminals, belonging to the group of the extension representative number, including the mobile terminal which is responding to the incoming call, and the transmission means transmits the push notification request corresponding to the non-response notification information to all the mobile terminals.

(Supplementary Note 7)

A communication system comprising:

the relay apparatus according to any one of Supplementary Notes 1 to 6; and the private branch exchange.

(Supplementary Note 8)

The communication system according to Supplementary Note 7, wherein the private branch exchange compares a caller number, which is a number of a telephone that has made a call to the extension representative number, with a caller number included in a request transmitted from the mobile terminal that has responded to the incoming call, and connects a call between the telephone and the mobile terminal that has responded to the incoming call when both of them match.

(Supplementary Note 9)

The communication system according to Supplementary Note 7 or 8, further comprising a push notification server that is a server configured to transmit a push notification to a mobile terminal, wherein the transmission means transmits the push notification request to the push notification server that transmits a push notification to the mobile terminal.

(Supplementary Note 10)

A relay method comprising:

receiving, from a private branch exchange, incoming call notification information indicating an incoming call notification, which is a notification indicating that an incoming call is made to an extension representative number;

generating a push notification request corresponding to the incoming call notification for each of a plurality of mobile terminals belonging to a group of the extension representative number based on the incoming call notification information; and performing processing for transmitting the push notification request to the corresponding mobile terminal.

(Supplementary Note 11)

The relay method according to Supplementary Note 10, further comprising converting the incoming call notification information into a push notification request addressed to each mobile terminal.

(Supplementary Note 12)

The relay method according to Supplementary Note 11, further comprising generating the push notification request from terminal numbers of a plurality of the mobile terminals belonging to the group of the extension representative number included in the incoming call notification information and the extension representative number.

(Supplementary Note 13)

The relay method according to Supplementary Note 12, further comprising generating the push notification request including a call pickup special number which is a number for responding to an incoming call to the extension representative number, the extension representative number, and a caller number which is a number of a telephone which has made a call to the extension representative number.

(Supplementary Note 14)

The relay method according to any one of Supplementary Notes 10 to 13, further comprising transmitting the push notification request to a push notification server that transmits a push notification to the mobile terminal.

(Supplementary Note 15)

The relay method according to any one of Supplementary Notes 10 to 14, further comprising, when receiving, from the private branch exchange, non-response notification information indicating a notification that one of a plurality of the mobile terminals has responded to an incoming call to the extension representative number, generating a push notification request corresponding to the non-response notification information to each of all the mobile terminals, belonging to the group of the extension representative number, including the mobile terminal which is responding to the incoming call, and transmitting the push notification request corresponding to the non-response notification information to all the mobile terminals.

(Supplementary Note 16)

A program for causing a computer to execute the following steps of:

receiving, from a private branch exchange, incoming call notification information indicating an incoming call notification, which is a notification indicating that an incoming call is made to an extension representative number;

generating a push notification request corresponding to the incoming call notification for each of a plurality of mobile terminals belonging to a group of the extension representative number based on the incoming call notification information; and performing processing for transmitting the push notification request to the corresponding mobile terminal.

While the present disclosure has been described with reference to the example embodiment, the present disclosure is not limited to the above example embodiment. Various changes that may be understood by those skilled in the art may be made to the configurations and the details of the present application.

This application is based upon and claims the benefit of priority from Japanese Patent Application No. 2020 087881, filed on May 20, 2020, the disclosure of which is incorporated herein in its entirety by reference.

REFERENCE SIGNS LIST

1 Relay Apparatus
2 Reception Unit
4 Generation Unit
6 Transmission Unit
10 Communication System
11 Telephone Network
12,13 Internet
14 Mobile Carrier Network
20 Telephone
40 Private Branch Exchange
60 Push Notification Server
70 Mobile Terminal
100 Relay Server
112 Reception Unit
114 Generation Unit
116 Transmission Unit

What is claimed is:

1. A relay apparatus comprising:
hardware, including a processor and memory;
a reception unit implemented at least by the hardware and configured to receive, from a private branch exchange, incoming call notification information indicating an incoming call notification indicating an incoming call to an extension representative number;
a generation unit implemented at least by the hardware and configured to generate a push notification request corresponding to the incoming call notification for each of a plurality of mobile terminals belonging to a group of the extension representative number based on the incoming call notification information, the push notification request including a call pickup special number for responding to an incoming call to the extension representative number, the extension representative number, and a caller number of a telephone making the incoming call to the extension representative number; and
a transmission unit implemented at least by the hardware and configured to perform processing for transmitting the push notification request to each mobile terminal.

2. The relay apparatus according to claim 1, wherein the generation unit converts the incoming call notification information into a push notification request addressed to each mobile terminal.

3. The relay apparatus according to claim 2, wherein the generation unit generates the push notification request from terminal numbers of the mobile terminals belonging to the group of the extension representative number included in the incoming call notification information and the extension representative number.

4. The relay apparatus according to claim 1, wherein the transmission unit transmits the push notification request to a push notification server that transmits a push notification to each mobile terminal.

5. The relay apparatus according to claim 1, wherein, when the reception unit receives, from the private branch exchange, non-response notification information indicating a notification that one of the mobile terminals has responded to the incoming call to the extension representative number, the generation unit generates a push notification request corresponding to the non-response notification information for each mobile terminal, and the transmission unit transmits the push notification request to each mobile terminal.

6. A communication system comprising:
the relay apparatus according to claim 1; and
the private branch exchange.

7. The communication system according to claim 6, wherein the private branch exchange compares the caller number of the telephone making the incoming call with a caller number included in a request transmitted from the mobile terminal that has responded to the incoming call, and connects the telephone and the mobile terminal when the caller number of the telephone matches the caller number included in the request match.

8. The communication system according to claim 6, further comprising a push notification server configured to transmit a push notification to each mobile terminal, wherein the transmission unit transmits the push notification request to the push notification server and the push notification server transmits the push notification to the mobile terminal.

9. A relay method performed by a relay apparatus and comprising:
receiving, from a private branch exchange, incoming call notification information indicating an incoming call notification indicating an incoming call to an extension representative number;
generating a push notification request corresponding to the incoming call notification for each of a plurality of mobile terminals belonging to a group of the extension representative number based on the incoming call notification information, the push notification request including a call pickup special number for responding to an incoming call to the extension representative number, the extension representative number, and a caller number of a telephone making the incoming call to the extension representative number; and
transmitting the push notification request to each mobile terminal.

10. The relay method according to claim 9, further comprising converting the incoming call notification information into a push notification request addressed to each mobile terminal.

11. The relay method according to claim 10, further comprising generating the push notification request from terminal numbers of the mobile terminals belonging to the group of the extension representative number included in the incoming call notification information and the extension representative number.

12. The relay method according to claim 9, further comprising transmitting the push notification request to a push notification server that transmits a push notification to each mobile terminal.

13. The relay method according to claim 9, further comprising, when receiving, from the private branch exchange, non-response notification information indicating a notification that one of the mobile terminals has responded to the incoming call to the extension representative number, generating a push notification request corresponding to the non-response notification information for each mobile terminal, and transmitting the push notification request to each mobile terminal.

14. A non-transitory computer readable medium storing a program for causing the relay apparatus to execute the relay method according to claim 9.

* * * * *